(12) United States Patent
Scholte (10) Patent No.: US 7,525,994 B2
(45) Date of Patent: Apr. 28, 2009

(54) PACKET DATA FLOW IDENTIFICATION FOR MULTIPLEXING

(75) Inventor: Alexander Martin Scholte, Chatswood (AU)

(73) Assignee: Avaya Inc., Basking Ridge, NJ (US)

(*) Notice: Subject to any disclaimer, the term of this patent is extended or adjusted under 35 U.S.C. 154(b) by 1044 days.

(21) Appl. No.: 10/355,542

(22) Filed: Jan. 30, 2003

(65) Prior Publication Data

US 2004/0151206 A1   Aug. 5, 2004

(51) Int. Cl.
    *H04J 3/24* (2006.01)
(52) U.S. Cl. .................. 370/474; 370/352; 370/466
(58) Field of Classification Search ................. 370/352, 370/353, 354, 356, 465, 466, 473, 474, 475, 370/476, 493, 494, 495
    See application file for complete search history.

(56) References Cited

U.S. PATENT DOCUMENTS

| | | | |
|---|---|---|---|
| 5,802,058 A | 9/1998 | Harris et al. | |
| 5,946,311 A | 8/1999 | Alexander, Jr. et al. | |
| 6,118,785 A | 9/2000 | Araujo et al. | 370/401 |
| 6,252,857 B1 | 6/2001 | Fendick et al. | |
| 6,353,616 B1 | 3/2002 | Elwalid et al. | |
| 6,389,038 B1 | 5/2002 | Goldberg et al. | 370/471 |
| 6,434,139 B1 * | 8/2002 | Liu et al. | 370/352 |
| 6,438,137 B1 | 8/2002 | Turner et al. | |
| 6,449,344 B1 | 9/2002 | Goldfinger et al. | |
| 6,453,349 B1 | 9/2002 | Kano et al. | |
| 6,477,164 B1 | 11/2002 | Vargo et al. | 370/356 |
| 6,483,835 B1 | 11/2002 | Tanigawa et al. | |
| 6,515,966 B1 | 2/2003 | Bardalai et al. | |
| 6,519,254 B1 | 2/2003 | Chuah et al. | |
| 6,563,793 B1 | 5/2003 | Golden et al. | |
| 6,598,080 B1 | 7/2003 | Nagami et al. | |
| 6,674,744 B1 * | 1/2004 | Doshi et al. | 370/352 |
| 6,678,474 B1 * | 1/2004 | Masuda et al. | 398/75 |
| 6,683,874 B1 * | 1/2004 | Nagami et al. | 370/392 |
| 6,697,352 B1 * | 2/2004 | Ludwig et al. | 370/349 |
| 6,735,190 B1 * | 5/2004 | Chuah et al. | 370/352 |
| 6,763,392 B1 | 7/2004 | del Val et al. | |

(Continued)

FOREIGN PATENT DOCUMENTS

JP       62-219732       9/1987

(Continued)

OTHER PUBLICATIONS

U.S. Appl. No. 09/359,850, filed Feb. 7, 2003, Scholte.

(Continued)

*Primary Examiner*—Chi H. Pham
*Assistant Examiner*—Kevin Mew
(74) *Attorney, Agent, or Firm*—Sheridan Ross P.C.

(57) ABSTRACT

The present invention is directed to the aggregation of data packets and to super packets for transmission across a communication network. In accordance with the present invention, an identifier associated with individual data packets is examined to determine whether such individual packet is suitable for inclusion in a super packet containing data packets associated with individual data flows. The identification may be included within a field established for a purpose other than marking an individual data packet in connection with forming aggregate packets. In particular, preexisting data fields may be utilized to identify packets for purposes of forming aggregate data streams.

35 Claims, 7 Drawing Sheets

U.S. PATENT DOCUMENTS

| | | | |
|---|---|---|---|
| 6,931,025 B1* | 8/2005 | Masuda | 370/466 |
| 6,931,448 B2 | 8/2005 | Holler et al. | |
| 6,967,927 B1 | 11/2005 | Dugeon et al. | |
| 6,970,450 B1 | 11/2005 | Scott | |
| 7,126,939 B2 | 10/2006 | Barany et al. | |
| 7,136,351 B2 | 11/2006 | Metin et al. | |
| 7,139,263 B2* | 11/2006 | Miller et al. | 370/352 |
| 7,143,191 B2 | 11/2006 | Chuah et al. | |
| 7,286,536 B2 | 10/2007 | Greis et al. | |
| 7,301,948 B2* | 11/2007 | Omae et al. | 370/392 |
| 7,400,582 B2 | 7/2008 | Shaheen et al. | |
| 7,420,988 B1* | 9/2008 | Grossman | 370/466 |
| 2001/0025321 A1 | 9/2001 | Tang et al. | |
| 2002/0087699 A1 | 7/2002 | Karagiannis et al. | |
| 2002/0097798 A1 | 7/2002 | Manor | |
| 2002/0105911 A1* | 8/2002 | Pruthi et al. | 370/241 |
| 2003/0133459 A1* | 7/2003 | Siddiqui et al. | 370/395.21 |
| 2003/0229690 A1* | 12/2003 | Kitani et al. | 709/223 |
| 2004/0003094 A1* | 1/2004 | See | 709/227 |
| 2004/0105459 A1* | 6/2004 | Mannam | 370/465 |
| 2004/0139088 A1 | 7/2004 | Mandato et al. | |
| 2004/0196843 A1 | 10/2004 | Zinin | |
| 2005/0013287 A1 | 1/2005 | Wallentin et al. | |
| 2005/0117580 A1 | 6/2005 | del Val et al. | |
| 2005/0207340 A1 | 9/2005 | O'Neill | |
| 2005/0216776 A1 | 9/2005 | Watanabe | |
| 2005/0226235 A1 | 10/2005 | Kumar et al. | |
| 2006/0114889 A1 | 6/2006 | Schneider et al. | |
| 2006/0168337 A1 | 7/2006 | Stahl et al. | |
| 2006/0182117 A1 | 8/2006 | Chen et al. | |
| 2006/0233333 A1 | 10/2006 | Brombal et al. | |
| 2006/0256719 A1 | 11/2006 | Hsu et al. | |
| 2007/0115825 A1* | 5/2007 | Roberts | 370/235 |
| 2007/0242677 A1 | 10/2007 | Shaheen et al. | |
| 2008/0019386 A1 | 1/2008 | Chen et al. | |

FOREIGN PATENT DOCUMENTS

| | | |
|---|---|---|
| JP | 2000-138711 | 5/2000 |
| JP | 2000-174818 | 6/2000 |
| JP | 2002-141932 | 5/2002 |
| JP | 2002-190825 | 7/2002 |
| JP | 2002-354020 | 12/2002 |
| WO | WO 00/11849 | 3/2000 |
| WO | WO 02/13023 | 2/2002 |
| WO | WO 02/13023 A1 | 2/2002 |

OTHER PUBLICATIONS

Thompson, Bruce et al., "Tunneling Multiplexed Compressed RTP ("TCRTP")," Internet Draft document of The Internet Engineering Task Force, Feb. 27, 2002, The Internet Society.

Thompson, Bruce et al., Tunneling Multiplexed Compressed RTP ("TCRTP"), Internet Draft document of The Internet Engineering Task Force, Jul. 19, 2001, available at http://www.Ietf.org/proceedings/01aug/I-D/draft-ietf-avt-tcrtp-04.txt, The Internet Society.

Tanigawa, Keiko et al., "Simple RTP Multiplexing Transfer Methods for VOIP," Internet Draft document of The Internet Engineering Task Force, Nov. 18, 1998, available at http://www.ietf.org/proceedings/02mar/I-D/draft-ietf-avt-tcrtp-06.txt, The Internet Society.

European Patent Office Communication attaching Search Report for European Patent Application No. 04250532.1 dated Oct. 4, 2004.

Braden, R., et al., "Resource ReSerVation Protocol (RSVP)," Network Working Group, RFC 2205 (Sep. 1997) pp. 1-112.

Bernet, Y, "Format of the RSVP DCLASS Object," Network Working Group, RFC 2996 (Nov. 2000) pp. 1-7.

European Examination Report for European Patent Application No. 04250650.1 dated Dec. 8, 2004, pp. 1-8.

Canadian Examination Report for Canadian Patent Application No. 2,454,980, Mar. 3, 2005, pp. 1-3.

U.S. Appl. No. 10/675,719, filed Sep. 29, 2003, Roush et al.

U.S. Appl. No. 10/808,172, filed Mar. 23, 2004, Scholte.

U.S. Appl. No. 11/036,305, filed Jan. 13, 2005, Corliss et al.

"Risk Exposure Through Instant Messaging and Peer-To-Peer (P2P) Networks," An X-Force™ White Paper, Internet Security Systems, Inc. (Apr. 2002), pp. 1-27.

"Special Report: Taking the voice over IP plunge," NetworkWorld (2003), pp. 1-12.

"The Instant Messaging Standards Race: Comparing XMPP/Jabber and SIP/Simple," Jabber, Inc., Version 1.0 (May 2003), pp. 1-11.

Article entitled, "Instant Messaging Guide—ICQ (I Seek You)," ViewZ Instant Messaging Guide (May 23, 2003), available at http://www.viewz.com/features/imguide2.shtml, 3 pages.

Article entitled, "Jabber:: Protocol—Authentication," Jabber Software Foundation (1999-2003), available at http://www.jabber.org/protocol/authentication.html, 1 page.

Article entitled, "Jabber:: Protocol—Core Data Elements," Jabber Software Foundation (1999-2003), available at http://www.jabber.org/protocol/coredata.html, 7 pages.

Article entitled, "Jabber:: Protocol—How File Transfer Works," Jabber Software Foundation (1999-2003), available at http://www.jabber.org/protocol/filetransfer.html, 3 pages.

Article entitled, "Jabber:: Protocol—XML Streams," Jabber Software Foundation (1999-2003), available at http://www.jabber.org/protocol/xmlstreams.html, 6 pages.

Article entitled, "Jabber::Protocol—Delayed Delivery," available at Jabber Software Foundation (1999-2003), http://www.jabber.org/protocol/delay.html, 3 pages.

Article entitled, "Jabber::Protocol—Groupchat," Jabber Software Foundation (1999-2003), available at http://www.jabber.org/protocol/groupchat.html, 4 pages.

Article entitled, "Jabber::Protocol—Presence Subscriptions," Jabber Software Foundation (1999-2003), available at http://www.jabber.org/protocol/subscriptions.html, 15 pages.

Cherry, Steven, "IM Means Business," IEEE Spectrum (Nov. 2002), pp. 28-32.

Hildebrand, Joe, et al., "Allow access to a Jabber server from behind firewalls which do not allow outgoing sockets on port 5222, via HTTP requests," Jabber Enhancement Proposal No. 0025, available at http://www.jabber.org/jeps/jep-0025.html, downloaded May 22, 2003, 7 pages.

Huuhtanen, Juha, "Real-Time Streaming Protocol (RTSP)," Dept. of Computer Science and Engineering, Helsinki University of Technology (Nov. 22, 1998), available at http://www.tcm.hut.fi/Studies/Tik-110.300/1998/Essays/rtsp.html, 7 pages.

Millard, Peter, "A protocol for managing server-side blacklist and whitelist rules," Jabber Enhancement Proposal No. 0016, Jabber Software Foundation, available at http://www.jabber.org/jeps/jep-0016.html, downloaded May 22, 2003 (7 pages).

Millard, Peter, "A protocol which allows two jabber endpoints to negotiate feature options between themselves," Jabber Enhancement Proposal No. 0020, Jabber Software Foundation, available at http://www.jabber.org/jeps/jep-0020.html, downloaded May 22, 2003 (15 pages).

Miller, Jeremie, et al., "Jabber protocol elements can be given an expiry date/time, a "use-by" timestamp, by attaching to it an <x/> extension qualified by the jabber:x:expire namespace," Jabber Enhancement Proposal No. 0023; Jabber Software Foundation, available at http://www.jabber.org/jeps/jep-0023.html, downloaded May 22, 2003 (4 pages).

Miller, Matthew, "A protocol for reporting and executing ad-hoc, human-oriented commands in Jabber," Jabber Enhancement Proposal No. 0050, Jabber Software Foundation, available at http://www.jabber.org/jeps/jep-0050.html, downloaded May 22, 2003 (16 pages).

Ridgway, Neil, "The Real Time Streaming Protocol (RTSP)," (Sep. 7, 1998), available at http://www.mmrg.ecs.soton.ac.uk/publications/archive/ridgway1998/html/node29.html, 2 pages.

Ridgway, Neil, "The Real-time Transport Protocol (RTP)," (Sep. 7, 1998), available at http://www.mmrg.ecs.soton.ac.uk/publications/archive/ridgway1998/html/node23.html, 2 pages.

Saint-Andre, Peter, "A robust protocol for text-based conferencing in Jabber," Jabber Enhancement Proposal No. 0045, Jabber Software Foundation, available at http://www.jabber.org/jeps/jep-0045.html, downloaded May 22, 2003 (82 pages).

Schulzrinne, H., et al., "RTP: A Transport Protocol for Real-Time Applications," Network Working Group RFC 1889 (Jan. 1996), available at http://www.iptel.org/info/players/ietf/media/rfc1889.txt, pp. 1-75.

Sjoberg, J., et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group RFC 3267 (Jun. 2002), available at http://rfc.sunsite.dk/rfc/3267.html, pp. 1-49.

Smith, Spencer, "Be Aware of Security Issues with ICQ Instant Messaging," Computing News (Spring 2000), available at http://cc.uoregon.edu/cnews/spring2000/icq.html, 5 pages.

Tyson, Jeff, "How Instant Messaging Works," HowStuffWorks, Inc., available at wysiwyg://65/http://www.howstuffworks.com/instant-messaging.htm, downloaded May 22, 2003, 3 pages.

Vamosi, Robert, "The next hacker target: instant messaging," ZDNET Reviews (May 30, 2002), available at http://zdnet.com.com/2100-1107-928415.html, 3 pages.

Background of the Invention for the above-captioned application (previously provided).

Examination Report for European Patent Application No. 04250532.1 dated Mar. 22, 2006.

Communication dated May 28, 2007 from the Japanese Patent Office for Application No. 2004-22441 citing JP 62-219732.

* cited by examiner

PACKET DATA FLOW IDENTIFICATION FOR MULTIPLEXING

FIELD OF THE INVENTION

The present invention is directed to the process of multiplexing packet data flows together into a single aggregate flow. In particular, the present application provides for the identification of individual flows suitable for aggregation into a single, combined flow.

BACKGROUND OF THE INVENTION

The concept of multiplexing packet data flows, including realtime transport protocol (RTP) flows together into a single aggregate flow is a concept that is addressed in a number of Internet engineering task force (IETF) Internet drafts. Multiplexing RTP flows would be desirable, because it can reduce the bandwidth usage of wide area network (WAN) links and decrease the RTP packet rate incident on edge routers. In addition, the multiplexing of RTP flows reduces the burden of administering networks, for example in connection with the configuration of quality of service levels. In addition, multiplexing RTP flows can increase the scalability of existing quality of service schemes.

Although IETF Internet drafts specifying packet formats for aggregate flows, header compression algorithms, and packet loss compensation have been proposed, there are no methods discussed for signaling to a multiplexer which RTP flows to aggregate into a single flow. Although a multiplexer could examine individual RTP flows to determine which packets are candidates for aggregation, doing so would be a significant burden on the multiplexer. In particular, an RTP multiplexer in such a system would be required to examine the destination addresses of individual packets to determine whether they could be aggregated with other packets for transport to another multiplexing device for deaggregation back into individual flows or packets. In addition, requiring a multiplexer to consider the destination addresses of individual packets to determine whether aggregation would be beneficial introduces additional latency into data streams. The addition of latency is particularly undesirable in connection with voice over Internet protocol (VoIP) sessions and may require the addition of costly hardware to the multiplexing device to mitigate or avoid. Furthermore, where explicit information regarding the flows that should be aggregated is not provided to a multiplexer, indeterminancy regarding which flows are aggregated is introduced into the system. This indeterminancy can contribute to delays while the multiplexing devices wait for expected packets that never arrive.

SUMMARY OF THE INVENTION

The present invention is directed to solving these and other problems and disadvantages of the prior art. Generally, according to the present invention, an identifier is assigned to a remote subnetwork having an associated multiplexer. The assigned identifier is communicated to communication devices and to a multiplexer associated with a first subnetwork. Packets originating at communication devices on the first subnetwork that are addressed to endpoints associated with a remote subnetwork for which an identifier has been assigned are associated with that identifier, and provided to the multiplexer on the first subnetwork. The multiplexer then bundles together or aggregates packets that are part of individual communication streams and that are associated with the same identifier, to form a super packet or aggregate stream. The aggregate stream is then passed to a second multiplexer associated with the remote subnetwork. At the second multiplexer, the aggregate stream is unbundled, and packets associated with individual streams are delivered to the appropriate endpoint or destination communication device.

In accordance with an embodiment of the present invention, the identifier is associated with an individual data packet or data stream using a pre-existing field. For example, a virtual local area network (VLAN) field that is typically used for the purpose of distinguishing between virtual local area networks (LANs) on the same physical LAN and resides in the Media Access Control (MAC) header is used to identify a multiplexer on a remote subnetwork. In accordance with another embodiment of the present invention, a differentiated services field (DS) that is normally used to define a type of service requirement is used to communicate the identifier. This field is also known as the type of service field (TOS) and resides in the Internet Protocol (IP) header. In accordance with yet another embodiment of the present invention, a resource reservation protocol (RSVP) field that is normally used to reserve resources on routers to ensure adequate quality of service for the bearer channel of a VoIP call over a WAN link is used to communicate the identifier. In accordance with still another embodiment of the present invention, the RSVP DCLASS object is used to communicate a differentiated services code point (DSCP) that is placed in the differentiated services field and used to identify individual flows that may be aggregated into a combined flow. In accordance with still other embodiments of the present invention, individual flows that may be aggregated are identified using information associated with the session initiation protocol (SIP) or H.323 signals to identify the parameters of the channel being negotiated to determine whether flows can be aggregated.

In accordance with an embodiment of the present invention, a system that provides a multiplexer as part of or in cooperation with a subnetwork router is provided. In addition, a control unit may be provided for assigning an identifier to a remote subnetwork. A system in accordance with the present invention may also include a second multiplexer associated with or implemented as a part of a second edge router associated with a remote or second subnetwork. The first and second edge routers may be interconnected to one another by a wide area network (WAN), which may include the Internet.

These and other advantages and features of the invention will become more apparent from the following discussion, particularly when taken together with the accompanying drawings.

DETAILED DESCRIPTION

The present invention is directed to the identification of data packets suitable for aggregation into a combined flow.

Figure 1:
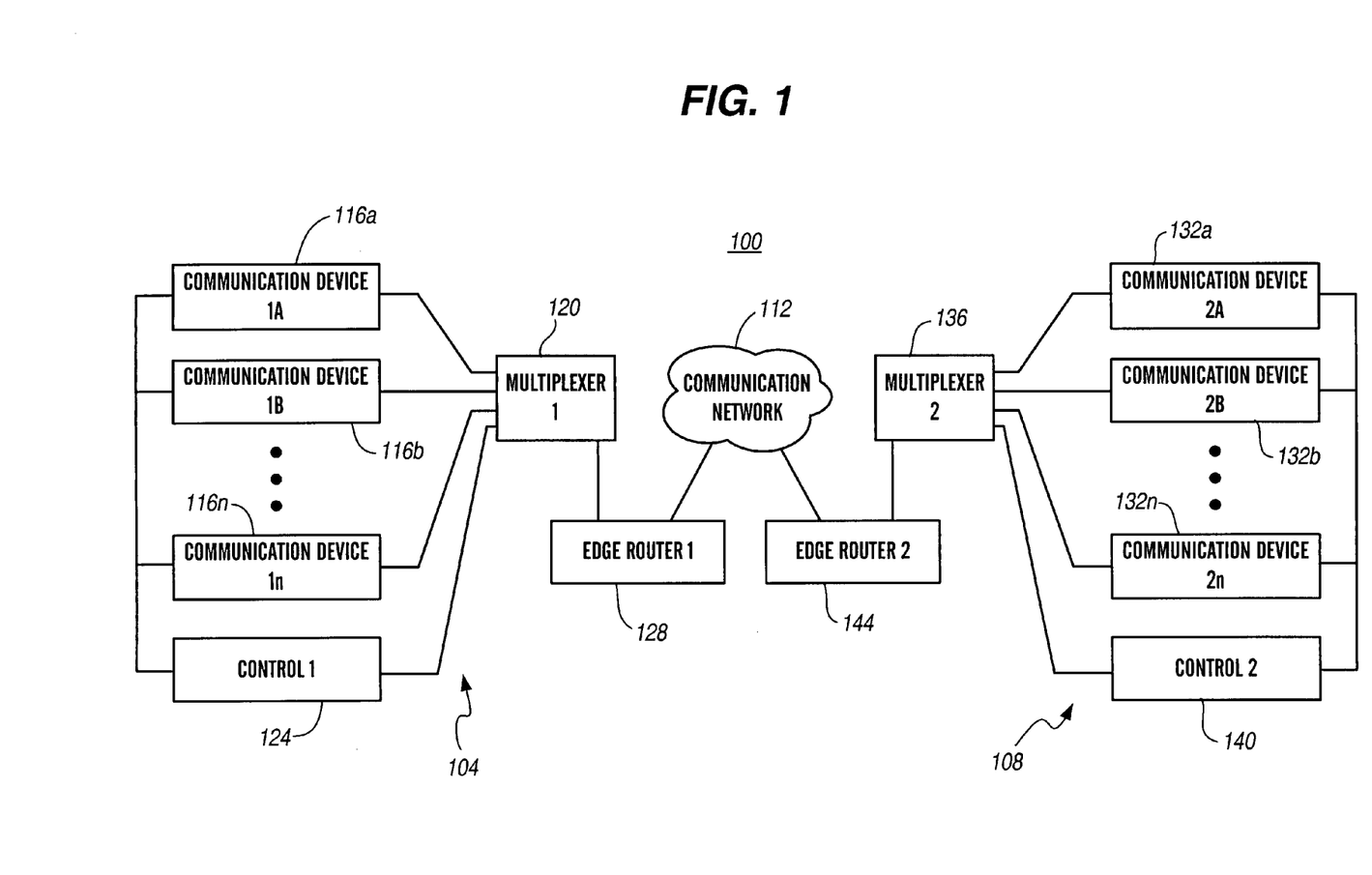
FIG. 1 is a block diagram depicting a communication system in accordance with an embodiment of the present invention.

In FIG. 1, a communication system 100 in accordance with an embodiment of the present invention is illustrated. In general, the communication system 100 includes a first subnetwork 104 and a second or remote subnetwork 108. The first subnetwork 104 is interconnected to the second subnetwork 108 by a communication network 112. The communication network 112 generally comprises a packet data network or combination of packet data and switched circuit networks. As an example, the communication network 112 may comprise the Internet, an intranet, or a combination of one or more intranets and the Internet.

The first subnetwork 104 generally includes a plurality of communication devices 116. The communication devices 116 are each interconnected to a multiplexer 120. A control unit 124 may be provided for coordinating activity between or among the communication devices 116 and the multiplexer 120. The first subnetwork 104 additionally includes an edge router 128 that interconnects the first subnetwork 104 to the communication network 112.

Like the first subnetwork 104, the second subnetwork 108 may include a plurality of communication devices 132, a multiplexer 136, a control 140, and an edge router 144.

In accordance with an embodiment of the present invention, the subnetworks 104, 108 may comprise local area networks (LANs). Accordingly, one or both subnetworks 104, 108 may be implemented as Ethernet networks.

The communication devices 116, 132 associated with the system 100 may include any device suitable for sending packet data across a communication network or subnetwork. Accordingly, the communication devices 116, 132 may comprise Internet protocol telephones, general purpose computers, personal digital assistants (PDAs) or other computing devices configured to function in connection with media communications, including communications that occur in realtime. The multiplexers 120, 136 generally function to aggregate media or data streams into bundled streams comprising super packets containing data packets that may originate from a number of communication devices (e.g., communication devices 116) associated with the first subnetwork 104 and that are addressed to one or more communication devices (e.g., communication devices 132) associated with a remote subnetwork 108. In connection with the receipt of aggregated data streams, a multiplexer (e.g., the second multiplexer 136) unbundles the aggregated streams to allow delivery of individual streams to recipient communication devices 132. As can be appreciated, the above described functions are generally reversed in connection with data packets originating at or through communication devices 132 associated with the second subnetwork 108 that are transmitted to communication devices 116 associated with the first subnetwork 104. In accordance with embodiments of the present invention, the multiplexers 120, 136 are implemented as general purpose or server computers running software implementing the bundling and unbundling functions. In alternative embodiments, hard-wired circuitry may be used in place of or in combination with software instructions to implement a multiplexer 120, 136. In accordance with another embodiment of the present invention, the multiplexers 120, 136 may be implemented as a part of the respective edge routers 128 or 144. In accordance with yet another embodiment the multiplexers 120, 136 may be implemented as a specialized device employing appropriate specialized hardware and configured as the network gateway for other VoIP devices to provide transparent access to those devices' data streams (e.g., RTP streams) if necessary.

The controls 124, 140 generally function to coordinate activity between the communication devices 116, 132 and the associated multiplexer 120 or 136. For example, the first control 124 may assign an identifier for use in connection with packets originating at or through communication devices 116 associated with the first subnetwork 104 that are addressed to communication devices 132 associated with the second subnetwork 108. The controls 124, 140 may be implemented as general purpose computers. In accordance with a further embodiment of the present invention, each control 124, 140 may be implemented as part of the corresponding multiplexer 120, 136 and/or edge router 128, 144.

The edge routers 128, 144 generally function to interconnect the respective subnetwork 104 or 108 to a communication network 112. In addition, an edge router 128, 144 in accordance with an embodiment of the present invention may incorporate the multiplexer 120, 136 and/or control 124, 140 of the respective subnetwork 104, 108.

Figure 2:
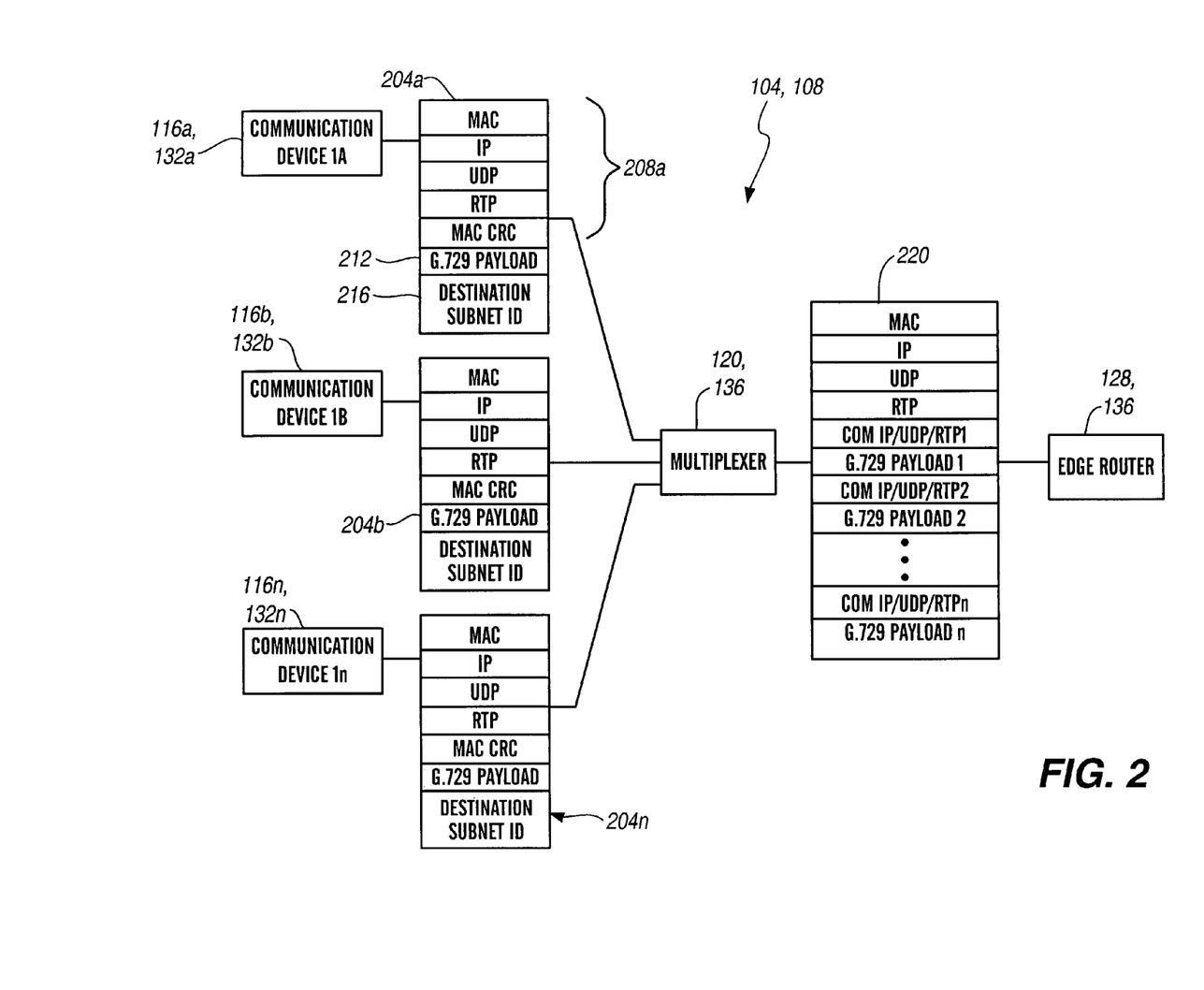
FIG. 2 is a diagram depicting packet flow through a subnetwork in accordance with an embodiment of the present invention.

With reference now to FIG. 2, the composition of data packets transmitted in accordance with an embodiment of the present invention are illustrated. In general, each of the communication devices 116, 132 is capable of transmitting (or receiving) data packets that include various fields. In particular, each of the data packets or individual data streams 204 includes various header information fields 208, such as the medium access control, Internet protocol, universal datagram protocol (UDP), realtime transport protocol (RTP), and medium access control cyclic redundancy check (MAC CRC) fields. In addition, each of the data packets 204 generally contains a payload 212, such as a G.729 payload. Furthermore, in accordance with the present invention, each of the data packets 204 includes a destination subnetwork Id 216. As will be described in greater detail below, the destination subnetwork Id 216 may be included within another of the fields, including any of the header information fields 208. The individual data packets 204 are provided to (or received from) the multiplexer 120, 136 associated with the subnetwork 104, 108.

The multiplexer 120, 136 aggregates the individual data packets 204 together into one or more super packets or aggregate data streams 220. As can be seen from FIG. 2, the super packet 220 includes its own header information. In addition, the super packet 220 includes the header information 208 and payloads 212 from the individual data packets 204. The super packet 220 is provided to (or received from) the edge router 128, 136.

As can be appreciated by one of skill in the art, the aggregation of individual data packets 204 into a super packet 220 generally reduces the burden on the edge router 128, 136. In particular, by aggregating multiple individual packets 204 into a lesser number of super packets 220, the number of individual packets that must be routed by the edge router 128, 136 is reduced. Furthermore, because it is the ability of a router 128, 136 to classify and route data packets, and not the bandwidth of the router's interfaces 128, 136 that typically limits a router's effective bandwidth, the present invention can increase the data transmission capabilities of a network or subnetwork 104, 108 carrying data streams having a large number of small packets.

Figure 3:
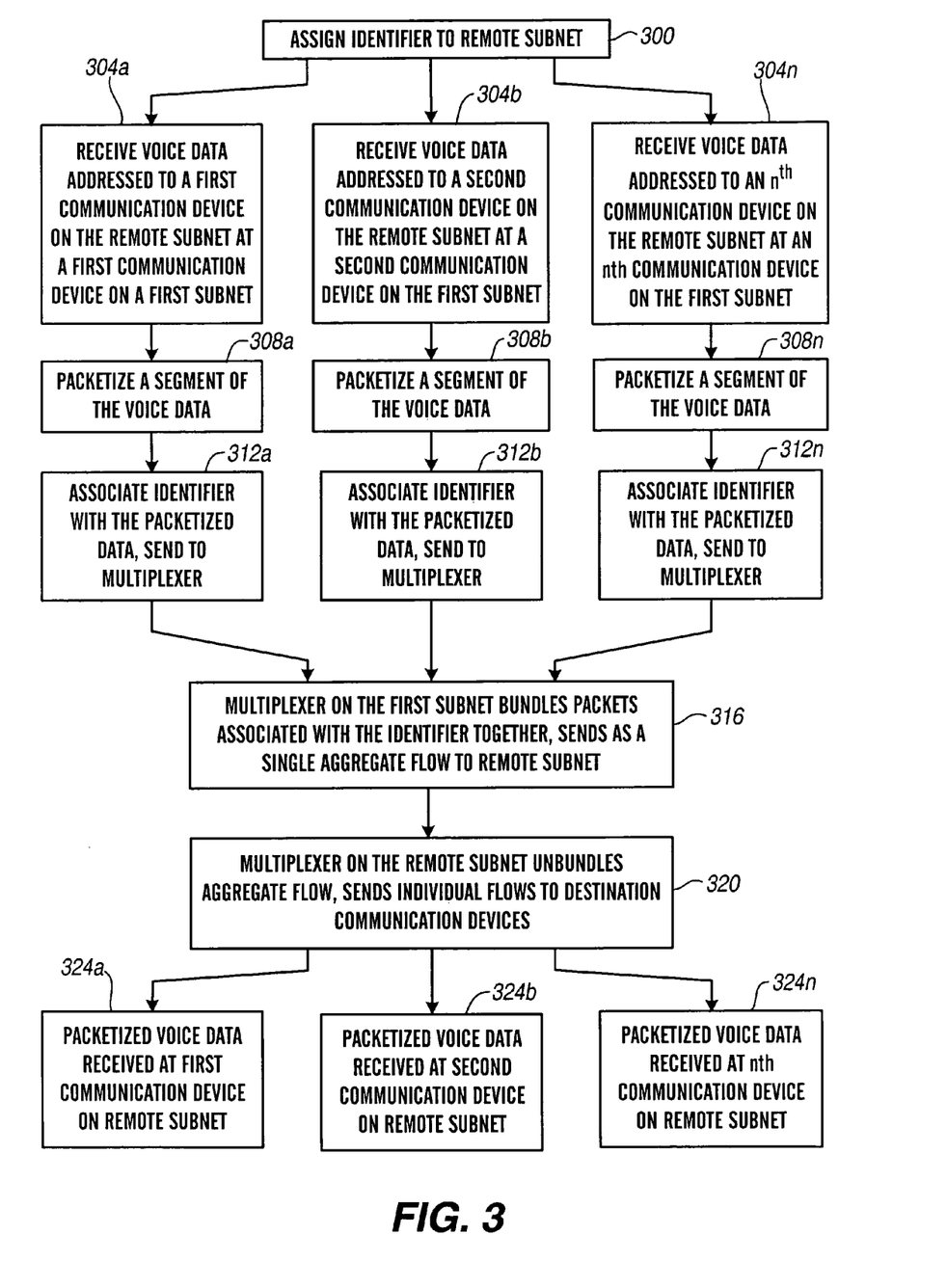
FIG. 3 is a flow chart illustrating the aggregation of data packets in accordance with an embodiment of the present invention.

With reference now to FIG. 3, a flow chart depicting the operation of a system 100 in accordance with an embodiment of the present invention is shown. Initially, at step 300, an identifier 216 is assigned to a remote subnetwork 108. At step 304a, voice data addressed to a first communication device 132a on the remote subnetwork 108 is received at a first communication device 116a on the first subnetwork 104. Similarly, at step 304b, voice data addressed to a second communication device 132b on the remote subnetwork 108 is received at a second communication device 116b on the first subnetwork 104. In addition, voice data may be received at an $n^{th}$ communications device 116n that is addressed to an $n^{th}$ communication device 132n on the remote subnetwork 108 (step 304n). At steps 308a-308n, the received data is packetized by the respective communication device 116a-116n. At steps 312a-312n, the assigned identifier 216 for the remote subnetwork 108 is associated with the packetized data by the respective communication device 116a-116n, and the communication devices 116a-116n send their data packets 204 to the multiplexer 120.

At step 316, the multiplexer 120 on the first subnetwork 104 bundles the packets 204 associated with the same identifier 216 together with one or more super packets or flows 220, and sends them to the remote subnetwork 108 across the communication network 112. As can be appreciated by one of skill in the art, by sending the various data packets 204 received from the communication devices 116a-116n as a single super packet 220, the processing load placed on the edge routers 128, 124 and the switches and routers associated with the communication network 112 is lessened. For instance, in the example illustrated in FIG. 3, instead of the three individual packets 204, only the header information associated with the single super packet must be considered by the routers and switches.

At step 320, the multiplexer 136 on the remote subnetwork 108 receives the super packet 220, unbundles the aggregate flow, and sends the individual flows (i.e., the individual packets 204) to the destination communication devices 132a-132n. At steps 324a-324n, the packetized voice data is received at the appropriate communication device 132a-132n on the remote subnetwork 108.

Figure 4:
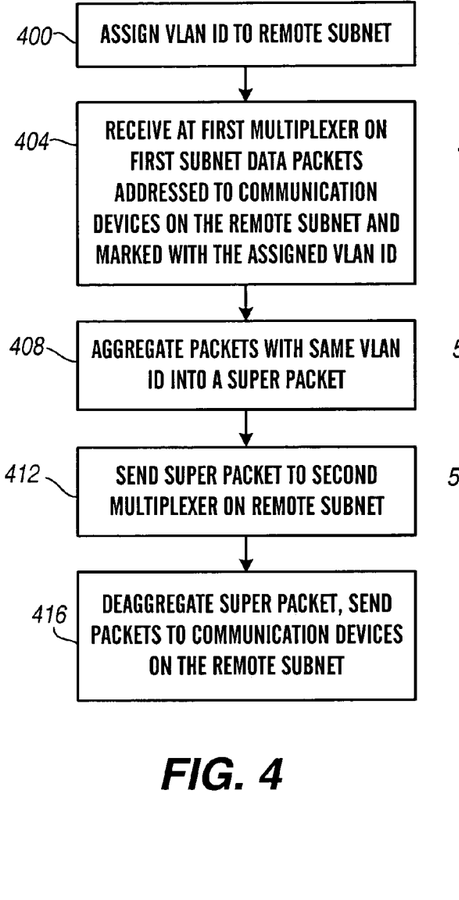
FIG. 4 is a flow chart depicting the identification of packets suitable for aggregation in accordance with an embodiment of the present invention.

With reference now to FIG. 4, the operation of a system 100 in accordance with an embodiment of the present invention is illustrated. In general, the embodiment illustrated in connection with FIG. 4 utilizes the virtual local area network (VLAN) identification field provided in connection with data packets 204 transmitted across the subnetwork 104 or 108 to associate or identify individual packets 204 with a multiplexer 136 at a remote subnetwork 108. More particularly, the VLAN Id field in the MAC header is used to identify a data packet 204 as being addressed to a communication device 132 associated with a remote subnetwork 108 having a multiplexer 136 in accordance with the present invention. As can further be appreciated, the assigned VLAN Id is selected so that it does not correspond to a valid virtual local area network established in connection with the first 104 or second 108 subnetworks.

Initially, at step 400, a VLAN Id is assigned in connection with a remote subnetwork 108. In particular, the first control 124 may function to select a VLAN Id to identify a remote subnetwork 108 having a multiplexer 136 in accordance with the present invention. Furthermore, the control 124 communicates the assigned identifier to each of the communication devices 116 on the first subnetwork 104, so that the communication devices 116 may utilize the identifier when they have data packets 204 addressed to communication devices 132 on the remote subnetwork 108.

At step 404, the first multiplexer 120 receives data packets 204 addressed to communication devices 132 on the remote subnetwork 108 that are marked with the assigned VLAN Id associated with the remote subnetwork 108. The mutliplexer 120 aggregates packets 204 having the same VLAN Id together into one or more super packets 220 (step 408).

The first multiplexer 120 then sends the super packet 220 to the second multiplexer 136 on the remote subnetwork 108. The second multiplexer 136 deaggregates the super packet 220, and sends the individual packets 204 to the appropriate communication devices 132 on the remote subnetwork 108 (step 416) as individual streams.

As can be appreciated from the description given herein in connection with FIG. 4, the transmitting multiplexer 120 is not required to consider whether the destination addresses of the individual packets 204 make those packets 204 suitable for aggregation into a super packet 220. Instead, the multiplexer 120 is only required to consider the relatively short VLAN Id field within each packet 204 to determine whether it contains an identifier associated with a second multiplexer 136 on a remote subnetwork 108. Furthermore, it can be appreciated that an embodiment in accordance with that described in connection with FIG. 4 does not require the definition of new data packet 204 information or header fields. Instead, a preexisting field is utilized. As can also be appreciated, the super packet 220 is sent to an address associated with the second multiplexer 136. Upon receiving a super packet 220 addressed directly to it, the second multiplexer 136 then unbundles the individual data streams 204 of the super packet 220 and delivers the individual packets 204 as noted above.

Figure 5:
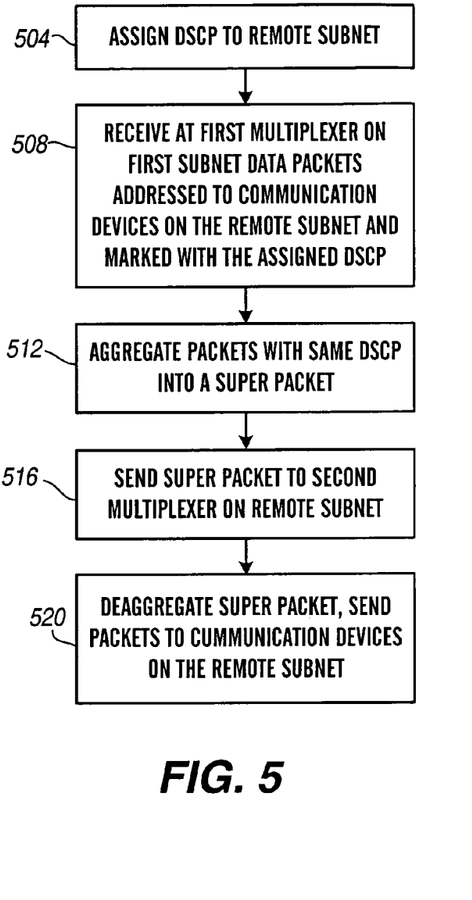
FIG. 5 is a flow chart depicting the identification of packets suitable for aggregation in accordance with another embodiment of the present invention.

With reference now to FIG. 5, the operation of a system 100 in accordance with another embodiment of the present invention is illustrated. In general, the embodiment illustrated in FIG. 5 utilizes the differentiated services field (DS) or Type of Service (TOS) field in the IP Header in order to identify individual data streams 204 that are addressed to communication devices 132 on a remote subnetwork 108 having a multiplexer 136 in accordance with the present invention.

At step 500, a Diffserv Code Point (DSCP) is assigned to the remote subnetwork 108. At step 508, the first multiplexer 120 receives data packets 204 addressed to communication devices 132 on the remote subnetwork 108 and marked with the DSCP assigned to that remote subnetwork 108. The first multiplexer 120 then aggregates the individual data packets or flows 204 having a common DSCP into one or more super packets or aggregate flows 220 addressed to the second multiplexer 136 (step 512). The super packet 220 is then sent to the second multiplexer 136 on the remote subnetwork 108 (step 516). The multiplexer 136 on the remote subnetwork 108 deaggregates the super packet 220, and sends the individual packets 204 comprising individual data streams to the appropriate communication devices 132 on the remote subnetwork 108 (step 520).

From the description given herein with respect to FIG. 5, it can be appreciated that an embodiment utilizing the DS field allows a multiplexer 120 to identify data packets 204 suitable for aggregation into a super packet 220 simply by considering the relatively short DSCP field associated with such data packets. Upon identifying multiple data packets 204 associated with a DSCP that has been assigned to a remote subnetwork 108, the multiplexer 120 bundles the individual packets 204 together, and addresses the resulting super packet 220 to the multiplexer 136 associated with the remote subnetwork 108. The multiplexer can place an appropriate DSCP value in the DS field of the super packet to nominate the required per hop behavior for the WAN portion of the communications network.

Figure 6:
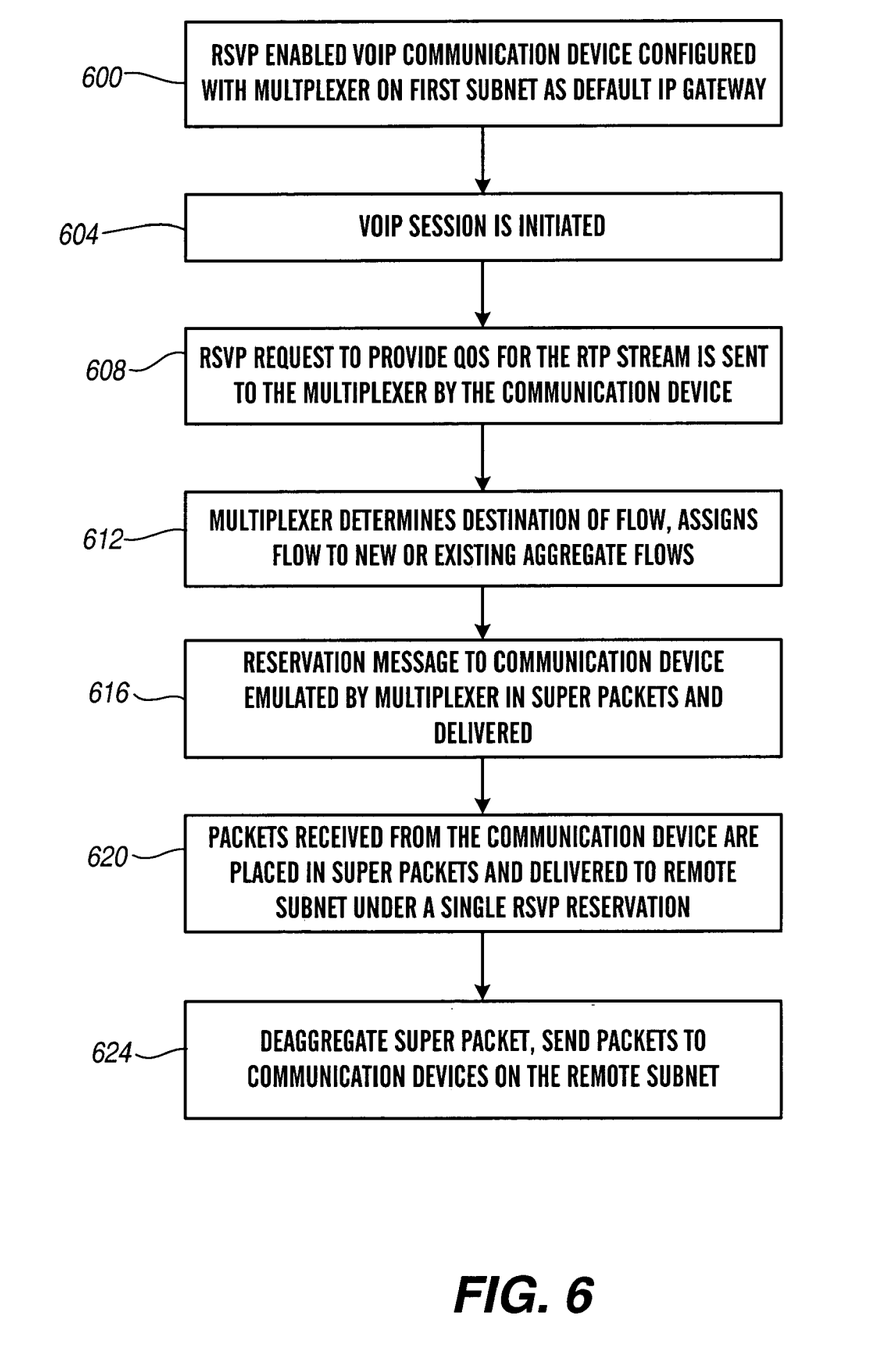
FIG. 6 is a flow chart depicting the identification of packets suitable for aggregation in accordance with another embodiment of the present invention.

With reference now to FIG. 6, the operation of a system 100 in accordance with yet another embodiment of the present invention is illustrated. In general, the embodiment described with reference to FIG. 6 utilizes the resource reservation protocol (RSVP) protocol to identify the source and destination address and port associated with individual data packets 204 in order to determine what RTP data flows can be expected. Individual data packets 204 that are part of such flows and that are addressed to communication devices 132 on the same subnetwork 108 are then aggregated into one or more super packets 220.

As an example of the operation of such an embodiment, an RSVP enabled VOIP communication device 116 is configured to use the first multiplexer 120 on the first subnetwork 104 as its default IP gateway (step 600). At step 604, a voice over Internet protocol session or other communication session is initiated. At step 608, an RSVP request (PATH message) to provide a certain quality of service for the RTP stream is sent to the multiplexer 120 by the communication device 116.

The multiplexer 120 determines the destination of the individual flow or RTP stream that will be received from the communication device 116, and assigns that flow to a new or existing aggregate flow (step 612). At step 616, a return reservation message (RESV message) to the communication device 116 is emulated by the multiplexer 120 and delivered to the communication device 116. The communication device 116 then sends individual packets 204 to the multiplexer 120. The individual packets 204 are received at the multiplexer 120, and are placed in a super packet 220 for delivery to the remote subnetwork 108 under a single RSVP reservation (step 620) that is maintained between the multiplexer and the remote multiplexer. The parameters of the RSVP reservation may be changed to accommodate the different requirements of the aggregate flows. The super packet 220 is received at the multiplexer 136 associated with the remote subnetwork 108, which deaggregates the super packet 220, and sends the individual packets 204 to the appropriate communication device or devices 132 on the remote subnetwork 108 (step 624).

As can be appreciated from the description set forth herein, an embodiment of the present invention utilizing the RSVP field allows the multiplexer 120 to know what VoIP flows to expect from the communication devices 116. However, the multiplexer 120 must examine the destination address of at least one individual packet 204 within an identified flow to determine the destination address of that flow. Therefore, the destination address serves as the initial identifier of individual data packets 204. RSVP information may then be used to identify packets suitable for aggregation. The information provided as part of the RSVP request also communicates when the individual flows begin and end, so that the multiplexer 120 can determine how many resources must be requested in connection with the created super packet 220 in order to ensure a desired level of service.

Figure 7:
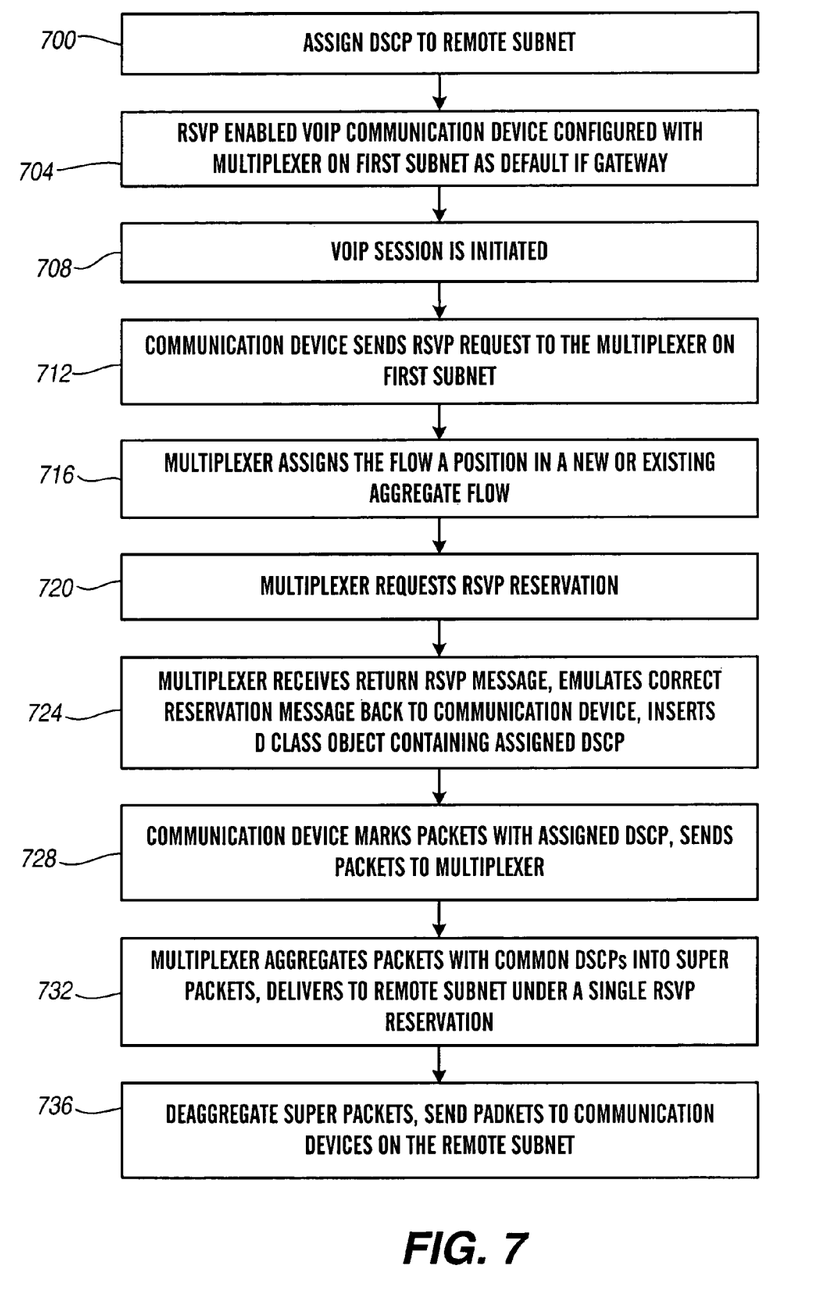
FIG. 7 is a flow chart depicting the identification of packets suitable for aggregation in accordance with another embodiment of the present invention.

In FIG. 7, a flow chart depicting the operation of a system 100 in accordance with yet another embodiment of the present invention is illustrated. In general, the embodiment illustrated in FIG. 7 utilizes the DS field to identify flows, and also uses information included as part of RSVP requests provided in connection with individual data streams to make a single RSVP request for an aggregate stream. According to such an embodiment, at step 700, a DSCP is assigned to identify a remote subnetwork 108. At step 704, an RSVP enabled VoIP communication device 116 is configured with the multiplexer 120 on the first subnetwork 104 as the device's default IP gateway. The VoIP session is then initiated (step 708).

At step 712, the communication device 116 sends an RSVP request to the multiplexer 120 on the first subnetwork 104 (step 712). The multiplexer 120 then assigns the flow 204 associated with the RSVP request to a position within a new or existing aggregate flow 220 (step 716).

At step 720, the multiplexer 120 requests an RSVP reservation for the aggregate flow 220. The multiplexer 120 receives a return RSVP message, emulates the correct reservation message back to the communication device 116, and inserts a DCLASS object containing the assigned DSCP (step 724).

The communication device 116 then marks individual packets with the assigned DSCP, and sends the packets 204 to the multiplexer 120 (step 728). The multiplexer 120 aggregates the packets 204 having common DSCPs into one or more super packets 220, and delivers the super packets 220 to the remote subnetwork 108 under a single RSVP reservation (step 732). The super packets 220 are received at the second multiplexer 136 on the remote subnetwork 108, which deaggregates the super packets 220, and sends the individual packets 204 to the appropriate communication devices 132 on the remote subnetwork 108 (step 736).

From the above description, it can be appreciated that the multiplexer 120 is only required to consider the DS fields in order to determine whether an individual data packet 204 is suitable for aggregation into a super packet 220. In addition, the embodiment discussed in connection with FIG. 7 allows a single RSVP reservation to be established in connection with a super packet 220. Accordingly, a desired level of service may be maintained, without requiring that a separate RSVP reservation be established for each of the individual data packets 220.

Figure 8:
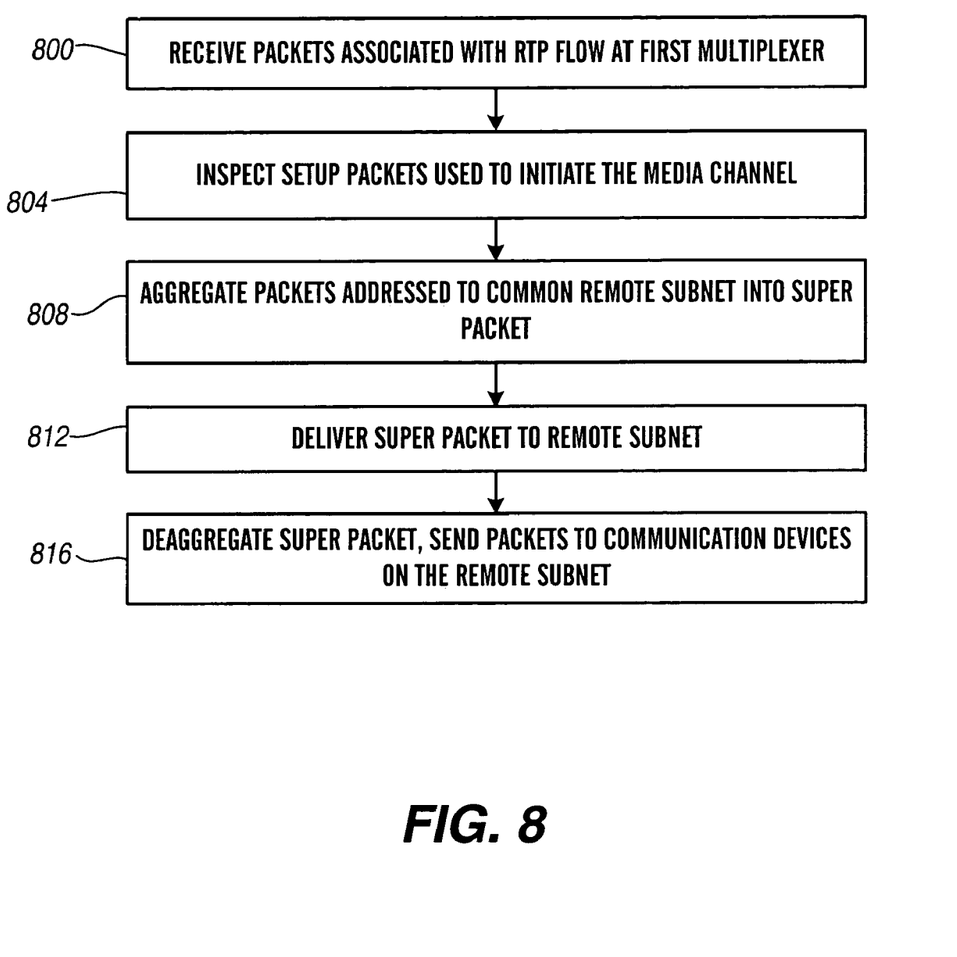
FIG. 8 is a flow chart depicting the identification of packets suitable for aggregation in accordance with another embodiment of the present invention.

With reference now to FIG. 8, a flow chart illustrating the operation of a system 100 in accordance with another embodiment of the present invention is illustrated. Initially, at step 800, packets associated with an RTP flow are received at a first multiplexer 120. The first multiplexer 120 inspects setup packets, defined according to any telephony signaling protocol, such as session initiation protocol (SIP) or H.323, used to initiate the media channel associated with the received packets (step 804). For example, in connection with a flow utilizing the session initiation protocol, the INVITE and ACK packets would be inspected to determine the parameters of the channel being negotiated. The multiplexer 120 then aggregates individual packets 204 that are addressed to a common remote subnetwork into one or more super packets 220 (step 808). The super packet 220 is then delivered to the remote subnetwork 108 (step 812). The multiplexer 136 associated with the remote subnetwork 108 then deaggregates the super packet 220, and sends the individual packets 204 to the appropriate communication devices 132 on the remote subnetwork 108 (step 816). The embodiment described in connection with FIG. 8 allows a router 128, 144 to identify individual flows 204 that are suitable for aggregation into a super packet 220, and also explicitly signals, according to the particular telephony signaling protocol used, the start and end of a realtime transport protocol flow.

Although the descriptions given above in connection with the various embodiments of the present invention have generally used the transmission of voice data in accordance with voice over Internet protocols or other realtime transfer protocols as examples, it should be appreciated that the present invention is not so limited. In particular, the present invention may be applied in connection with any transmission of data across a packet data network.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for multiplexing packet data transmissions, comprising:
    assigning an identifier to a first network element, wherein said identifier identifies said first network element, and wherein said identifier is not an Internet Protocol address of said first network element;
    associating in at least a second network element said identifier with a plurality of data packets, wherein said identifier is not included in a destination address field of any of said plurality of data packets;
    recognizing in at least a third network element said identifier with respect to said plurality of data packets, wherein said identifier indicates to said third network element that data packets associated with said identifier can be aggregated with one another, and wherein said third network element aggregates said plurality of data packets, and wherein said third network element is not required to consider information in a destination address field in order to recognize data packets that can be aggregated with one another;
    aggregating in said third network element said plurality of data packets associated with said identifier together into a bundle of data packets; and
    addressing said bundle of data packets to said first network element.

2. The method of claim 1, wherein said third network element comprises a packet data multiplexer.

3. The method of claim 2, wherein said packet data multiplexer comprises a router.

4. The method of claim 2, further comprising:
    sending said bundle of data packets to said first network element;
    deaggregating said plurality of data packets;
    delivering a first of said plurality of data packets to a first receiving communication device; and
    delivering a second of said plurality of data packets to s second receiving communication device.

5. The method of claim 1, wherein said identifier is communicated using a field established in connection with at least a first protocol for a purpose other than communicating said identifier.

6. The method of claim 1, wherein said identifier comprises a virtual local area network identifier.

7. The method of claim 6, wherein said virtual local area network identifier is associated with said data packets by writing said identifier as part of a medium access control for said data packets.

8. The method of claim 1, wherein said identifier comprises a DiffServ Code Point.

9. The method of claim 1, wherein said identifier comprises a resource reservation protocol request.

10. The method of claim 1, wherein said step of associating a plurality of data packets with said identifier comprises associating said identifier with a first data packet in a first originating communication device and associating said identifier with a second data packet in a second originating communication device.

11. A system for multiplexing packet data transmissions, comprising:
    at least first communication device means for forming data packets and for marking said data packets with a first identifier using an existing data field, wherein said existing data field is not an Internet Protocol address field, wherein said existing data field is not a destination address field, and wherein said first identifier identifies a first network element;
    first means for recognizing said first identifier marking said data packets and for aggregating first and second data packets associated with said first identifier into a super packet, wherein said first identifier indicates to said first means for recognizing that said data packets marked with said first identifier can be aggregated with one another, and wherein said first identifier is the only information required by said first means for recognizing in order to aggregate said first and second data packets;
    means for interconnecting said first means for recognizing said first identifier marking said data packets and for aggregating to a communication network, wherein said super packet including said aggregated data packets marked with said first identifier may be transmitted to a remote subnetwork.

12. The system of claim 11, wherein said existing data field is not an Internet protocol address field.

13. The system of claim 11, further comprising:
    means for associating a remote subnetwork with said identifier.

14. The system of claim 11, further comprising:
    means for deaggregating said super packet.

15. A data multiplexer comprising:
    an interface, wherein a plurality of packets marked with a first identifier and containing a destination address other than said first identifier are received by said interface, wherein said first identifier identifies a first network element, wherein said first identifier is not an Internet Protocol address, and wherein said first identifier is not included in a destination address field of any of said plurality of packets marked with said first identifier; and
    a processor running operating code, wherein said plurality of data packets marked with said first identifier are aggregated into a super packet and provided to said interface for delivery to said first network element, wherein said first identifier indicates to said processor running operating code that said packets marked with said first identifier can be aggregated with one another into a super packet for delivery to said first network element, and wherein said processor running operating code aggregates said plurality of data packets marked with said first identifier without regard to a destination address of any of said plurality of data packets.

16. The data multiplexer of claim 15, wherein said interface comprises an input from a first communication network and an output to at least one of a router and a second communication network.

17. The data multiplexer of claim 15, further comprising:
    data storage, wherein said operating code comprises software.

18. A method for multiplexing packet data transmissions, comprising:

receiving a first data packet containing a first destination address in a first field comprising an address field and a first identifier in a second field, wherein said first identifier identifies a first network element having a second destination address, wherein said second field is defined by at least a first network protocol as being for purposes other than communicating an identifier identifying a network element, wherein said first identifier is not an Internet Protocol address, wherein said second destination address of said first network element is different than said first destination address, and wherein said second field of said first data packet having said first identifier is not a destination address field;

receiving a second data packet containing at least one of said first destination address and a third destination address in a first field comprising an address field and said first identifier in a second field, wherein said second field of said second data packet is not a destination address field; and forming a super packet containing as a payload said first and second data packets, wherein said super packet contains said second destination address in an address field, wherein said first identifier indicates that said first and second data packets containing said first identifier in a second field can be aggregated with one another, and wherein forming a super packet is performed without consideration of said address field of said first data packet or of said address field of said second data packet.

19. The method of claim 18, wherein said second field comprises a virtual local area network identifier field.

20. The method of claim 18, wherein said second field comprises a differential service code point field.

21. The method of claim 18, wherein said second field comprises a resource reservation protocol field.

22. The method of claim 18, wherein said second field comprises a resource reservation protocol DCLASS object field.

23. The method of claim 18, wherein said second field comprises a session initiation protocol field.

24. The method of claim 18, wherein said first network element comprises a multiplexer on a remote subnetwork.

25. The method of claim 24, wherein said first destination address comprises an endpoint on said remote subnetwork.

26. The method of claim 18, wherein said first and second data packets each include a payload comprising data.

27. The method of claim 18, wherein said computational component comprises a computer readable storage medium carrying instructions for performing the method.

28. A method for identifying data packets for multiplexing, comprising:

receiving at a first multiplexer a first request to reserve resources for a first packet data flow;

determining from said request a destination for said first data packet flow;

receiving at said first multiplexer a second request to reserve resources for a second packet data flow;

determining from said request a destination for said second data packet flow;

receiving at said first multiplexer a first data packet marked with a first DiffServ Code Point value as part of said first data packet flow, wherein said first DiffServ Code Point value is assigned to identify a first remote subnetwork, wherein said DiffServ Code Point value is not a destination address, and wherein said DiffServ Code Point value is not included in a destination address field of said first data packet of said first data packet flow;

receiving at said first multiplexer a first data packet marked with said first DiffServ Code Point value as part of said second data packet flow, wherein said first DiffServ Code Point value is assigned to identify a first remote subnetwork, wherein said DiffServ Code Point value is not a destination address, and wherein said DiffServ Code Point value is not included in a destination address field of said first data packet of said second data packet flow;

in response to determining that said first data packet received as part of said first data packet flow and said first data packet received as part of said second data packet flow are both marked with said first DiffServ Code Point value, aggregating at least said first data packet from said first data packet flow with said first data packet from said second data packet flow to form a super packet, wherein said first DiffServ Code Point value indicates to said first multiplexer that said first data packet marked with said first DiffServ Code Point value received at said first multiplexer as part of said first data packet flow and said first data packet marked with said first DiffServ Code Point value received at said first multiplexer as part of said second data packet flow can be aggregated with one another to form said super packet, and wherein an address field of said first data packet of said first data packet flow and an address field of said first data packet of said second data packet flow are not considered in connection with aggregating at least said first data packet from said first data packet flow with said first data packet from said second data packet flow to form a super packet; and sending said super packet to a second multiplexer associated with said first subnetwork under a single resource reservation.

29. The method of claim 28, further comprising:

in response to receiving said first request to reserve resources, providing a first identifier comprising said first DiffServ Code Point to a first communication device and associated with said first request are marked with said first identifier.

30. The method of claim 28, wherein said single resource reservation requests a first quantity of resources.

31. The method of claim 30, further comprising:

receiving at said multiplexer a third request to reserve resources for a third packet data flow, wherein said single reservation requests a second quantity of resources.

32. A method for identifying data packets for multiplexing, comprising:

receiving at a first multiplexer at least a first setup packet associated with a first packet data flow;

determining from said at least a first setup packet a destination for said first data packet flow;

receiving at said first multiplexer at least a second setup packet associated with a second packet data flow;

determining from said at least a second, setup packet a destination for said second data packet flow;

associating a first identifier with a first subnetwork, wherein said first identifier is not an Internet Protocol address;

receiving a first data packet associated with said first identifier and said first data packet flow at said first multiplexer, wherein said first identifier is not included in a destination address field of said first data packet of said first data packet flow;

receiving a first data packet associated with said first identifier and said second data packet flow at said first multiplexer, wherein said first identifier is not included in a destination address field of said first data packet of said second data packet flow;

in response to detecting said first identifier with respect to said first data packet associated with said first data packet flow and said first identifier with respect to said first data packet associated with said second data packet flow, aggregating at least said first data packet from said first data packet flow with said first data packet from said second data packet flow to form a super packet, wherein said first identifier alone indicates to said first multiplexer that said first data packet associated with said first identifier and said first data packet flow and said first data packet associated with said first identifier and said second data packet flow can be aggregated with one another to form said super packet; and sending said super packet to a second multiplexer associated with said first subnetwork.

33. The method of claim 32, wherein said setup packet comprises at least one of a session initiation protocol and an H.323 protocol packet.

34. A method for aggregating multiple packet data flows, comprising:

sending a first RSVP request associated with a first data packet flow from a first communication device to a first multiplexer;

determining by the first multiplexer a destination of the first data packet flow;

assigning by the first multiplexer the first data packet flow to a first aggregate flow;

sending from the first multiplexer to the first communication device a return reservation message, wherein a first RSVP flow for the first data packet flow is established;

sending a first data packet of the first data packet flow containing a first identifier indicating that the first data packet is associated with the first RSVP flow from the first communication device to the first multiplexer, wherein the first identifier indicating that the first data packet is associated with the first RSVP flow is not included in a destination address field of the first data packet of the first data packet flow;

recognizing in the first multiplexer the first identifier;

aggregating the first data packet from the first communication device with a second data packet from a second data packet flow into a first super packet; and transmitting the first super packet from the first multiplexer to a remote multiplexer as part of a first aggregate flow, wherein the first aggregate flow is made under an RSVP reservation between the first multiplexer and the remote multiplexer, the method further comprising:

discontinuing the first data packet flow;

after discontinuing the first data packet flow, continuing to maintain the first aggregate flow between the first multiplexer and the remote multiplexer.

35. The method of claim 34, further comprising:

sending a second RSVP request associated with the second data packet flow from a second communication device to the first multiplexer;

determining by the first multiplexer a destination of the second data packet flow;

assigning by the first multiplexer the second data packet flow to the first aggregate flow;

sending from the first multiplexer to the second communication device a return reservation message, wherein a second RSVP flow for the second data packet flow is established;

sending a first data packet of the second data packet flow containing a second identifier indicating that the first data packet is associated with the second RSVP flow from the second communication device to the first multiplexer, wherein the second identifier indicating that the first data packet is associated with the second RSVP flow is not included in a destination address field of the first data packet of the second data packet flow;

recognizing in the first multiplexer the second identifier, wherein the first data packet from the second communication device is aggregated with the first data packet from the first communication device into the first super packet.

* * * * *